Sept. 24, 1935.   R. M. FRAPS   2,015,264
APPARATUS FOR IRRADIATION
Filed Sept. 16, 1932
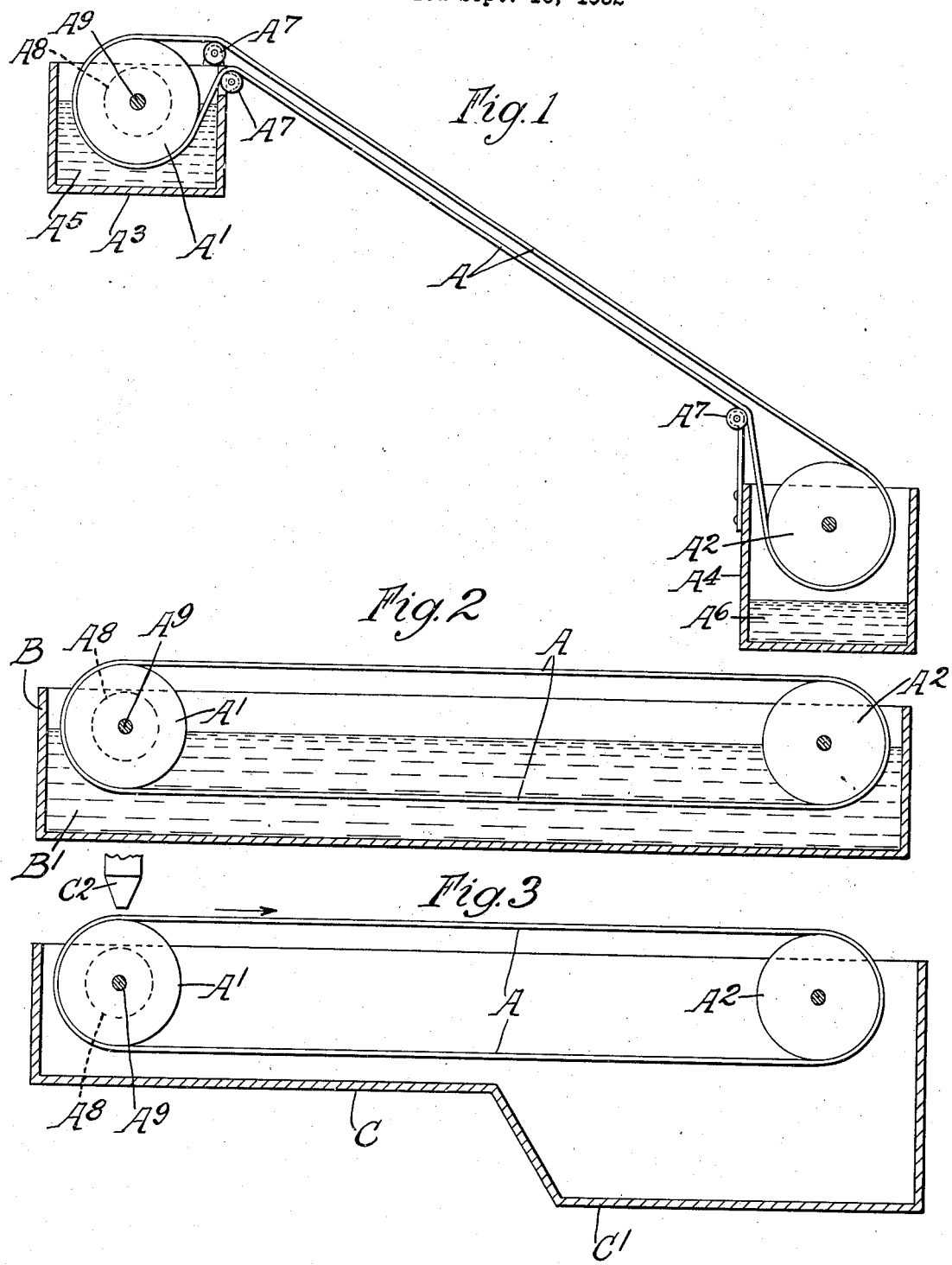
Inventor
Richard Mason Fraps
by Burton & Burton
Attorneys.

Patented Sept. 24, 1935

2,015,264

UNITED STATES PATENT OFFICE 2,015,264

APPARATUS FOR IRRADIATION

Richard Mason Fraps, Chicago, Ill.

Application September 16, 1932, Serial No. 633,409

1 Claim. (Cl. 99—2)

My invention relates to an apparatus for and a method of treating materials by subjecting them to radiation. One object is the provision of means for passing materials through a field of radiation. Another object is the provision of means for subjecting materials to solar radiation. Other objects will appear from time to time in the course of the specification and claims.

I illustrate my invention more or less diagrammatically in the accompanying drawing, wherein—

Figure 1 illustrates one form of my device;
Figure 2 illustrates a variation thereof; and
Figure 3 illustrates a further variation, all said devices being applicable for the practice of my method.

Like parts are indicated by like symbols throughout the specification and drawing.

Referring to the drawing, and particularly to Figure 1, I may employ an endless belt or conveyor generally indicated as A. This belt passes around rollers or pulleys $A^1$ $A^2$. In the form of Figure 1 the roller $A^1$ is positioned within a housing or container $A^3$ and the roller $A^2$ within a corresponding container $A^4$. The material to be treated, which may be in liquid form, is indicated as at $A^5$ and $A^6$. $A^7$ are any suitable guiding rolls or means, for example idlers, for the belt A. It will be realized that any suitable means may be employed for actuating the belt, for example by rotating one or both of the rollers $A^1$ $A^2$. Since means for rotating rollers are well known and do not of themselves form part of the present invention, such actuating or rotating means are not herein indicated in detail. However, $A^8$ diagrammatically indicates any suitable motor means, such as a pulley, adapted to rotate the shaft $A^9$ of the roller $A^1$.

Referring to Figure 2 the guide rollers or idlers $A^7$ are dispensed with and the belt A and the rollers $A^1$ and $A^2$ are positioned within a single container B, the fluid within the container being indicated as at $B^1$.

Referring to Figure 3 the disposition of belt and rollers is the same as in Figure 2 and a single container C is employed which may include a deepened portion $C^1$. $C^2$ indicates a delivery member, for example a spout, whereby material may be delivered to the upper stretch of the belt A. The material so delivered may be discharged from the opposite end of the belt into the deep portion of the container.

It will be realized that whereas I have described and shown practical and operative devices and means for carrying out my method, that I wish nevertheless to have my description and drawing taken as in a broad sense illustrative and diagrammatic, rather than as limiting me to my precise showing.

The use and operation of my invention are as follows:

My invention consists in an improved apparatus for and method of subjecting materials capable of activation to activation by radiation. A practical use or application of my apparatus and method is in the activation of materials, for example ergosterol, by subjection to solar ultraviolet radiation, to impart to them anti-rachitic characteristics. In order to compensate for the relative weakness or diffuseness of unconcentrated solar radiation, I provide means for passing the material to be activated in a thin layer or stream through a relatively large field of radiation. Considering for example the figures herein shown a relatively long belt may be employed whereby the material picked up by or fed to the belt may travel for a considerable distance, say several feet or more, through an area subjected to solar radiation. The material to be activated may be handled as a liquid, the ergosterol for example, being employed in any suitable solvent or fluid carrying medium. In the form of Figure 1 the unactivated material is shown as at $A^5$. As the belt moves it picks up a film or thin layer of the fluid and carries it, any desired speed, through the field of radiation. The fluid may be deposited by the belt in the container $A^4$, its tendency to be carried by the belt to the upper container $A^3$ being minimized by any suitable means, for example the lower roller $A^7$, which serves to strip the thin film of material upon the belt. A belt of any suitable material may be employed, preferably with a smooth surface to which the substance will adhere in a relatively thin film or layer of generally uniform thickness.

Referring to the form of Figure 2, only a single container is employed, the container B, and a substantial body of material may be maintained in the container. Movement of the belt A results in the picking up of a thin film or layer of the material to be activated, which is carried at any suitable speed through the field of radiation and returned again to the general body of material $B^1$. As the belt and the rollers incidentally agitate the material in the container, the activating effect upon the entire bulk of the mass is substantially uniform.

Referring to Figure 3, if it is desired to activate dry material, for example material in powdered or granular or finely divided form, such dry material may be fed from the spout $C^2$ and conveyed by the belt for discharge into the deep portion $C^1$ of the container C.

It will be realized that the length of the belt A and its speed of rotation may be governed to suit the desired degree of activation, the sensitiveness of the material treated to activation and the intensity of the radiation. Longer belts may be desirable for some materials than for others, and a more rapid travel. Also the speed of movement of the belt and the total time of actuation may be varied, depending for example upon the total mass of the material being treated.

I claim:

In an apparatus for subjecting liquid material directly to solar radiation, a container for the liquid to be treated and a separate container to receive the liquid after treatment, together with an endless belt extending from one container to the other and means on which said belt is guided for travel, said means serving to support a comparatively extensive area of said belt in a plane substantially perpendicular to the direction of incident solar rays; and one container being sufficiently independent of the other to permit adjusting it for maintaining the perpendicular relation of said belt to the sun's rays throughout a period of exposure thereto.

RICHARD MASON FRAPS.